US010791132B1

(12) United States Patent
Power et al.

(10) Patent No.: US 10,791,132 B1
(45) Date of Patent: Sep. 29, 2020

(54) SYSTEM AND METHOD FOR IDENTIFYING SUSPICIOUS NETWORK TRAFFIC

(71) Applicant: Amazon Technologies, Inc., Seattle, WA (US)

(72) Inventors: Conor Power, Dublin (IE); Lisa Huang, Seattle, WA (US); Leonard Tracy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 15/619,353

(22) Filed: Jun. 9, 2017

(51) Int. Cl.
*H04L 29/06* (2006.01)

(52) U.S. Cl.
CPC ........ *H04L 63/1425* (2013.01); *H04L 63/029* (2013.01); *H04L 63/0428* (2013.01); *H04L 63/1416* (2013.01)

(58) Field of Classification Search
CPC .............. H04L 63/1425; H04L 63/029; H04L 63/0428; H04L 63/1416
See application file for complete search history.

(56) References Cited

U.S. PATENT DOCUMENTS

| 6,898,632 | B2 * | 5/2005 | Gordy ................. H04L 63/1408 709/224 |
| 8,300,641 | B1 * | 10/2012 | Vincent ............... H04L 61/1505 370/392 |
| 2012/0250682 | A1 * | 10/2012 | Vincent .................. H04L 45/74 370/390 |
| 2014/0279306 | A1 * | 9/2014 | Shi .......................... G06Q 40/12 705/30 |
| 2015/0215841 | A1 * | 7/2015 | Hsu ........................ H04L 43/12 370/328 |
| 2016/0191545 | A1 * | 6/2016 | Nanda ................... H04L 43/028 726/1 |

* cited by examiner

*Primary Examiner* — Joseph P Hirl
*Assistant Examiner* — Chi D Nguy
(74) *Attorney, Agent, or Firm* — Davis Wright Tremaine LLP

(57) ABSTRACT

The disclosure includes a method that includes receiving network traffic having a first plurality of packets that each indicate a first packet source and a first packet destination; determining an analysis host destination for each of the first plurality of packets such that the packets are distributed among a plurality of analysis hosts with communications between a given source-destination pair being sent to the same analysis host; encapsulating the first plurality of packets to generate a second plurality of encapsulated packets having the first plurality of packets as a second packet payload; and sending the second plurality of encapsulated packets to respective analysis host destinations.

21 Claims, 9 Drawing Sheets

SYSTEM AND METHOD FOR IDENTIFYING SUSPICIOUS NETWORK TRAFFIC

BACKGROUND

Identifying suspicious traffic on a network can be desirable for increasing security for data and services of the network and for protecting internal and external users of the network. For example, identifying potentially suspicious network traffic can allow for detection and prevention of attacks by malicious users or bots including attempts to access sensitive user data stored by the network or attempts to disrupt services provided by the network.

However, despite being important for network security, identifying potentially suspicious network traffic can be difficult and expensive. For example, some methods of identifying potentially suspicious network traffic can use the content of such network traffic for identification, but are unable to identify a location within the network from which such network traffic originated or traveled while being communicated. Additionally, some methods of identifying potentially suspicious network traffic can include the use of load-balancers, which can be expensive and complex pieces of hardware that increase the cost of employing network security services.

BRIEF DESCRIPTION OF THE DRAWINGS

Various techniques will be described with reference to the drawings, in which.

DETAILED DESCRIPTION

Figure 1:
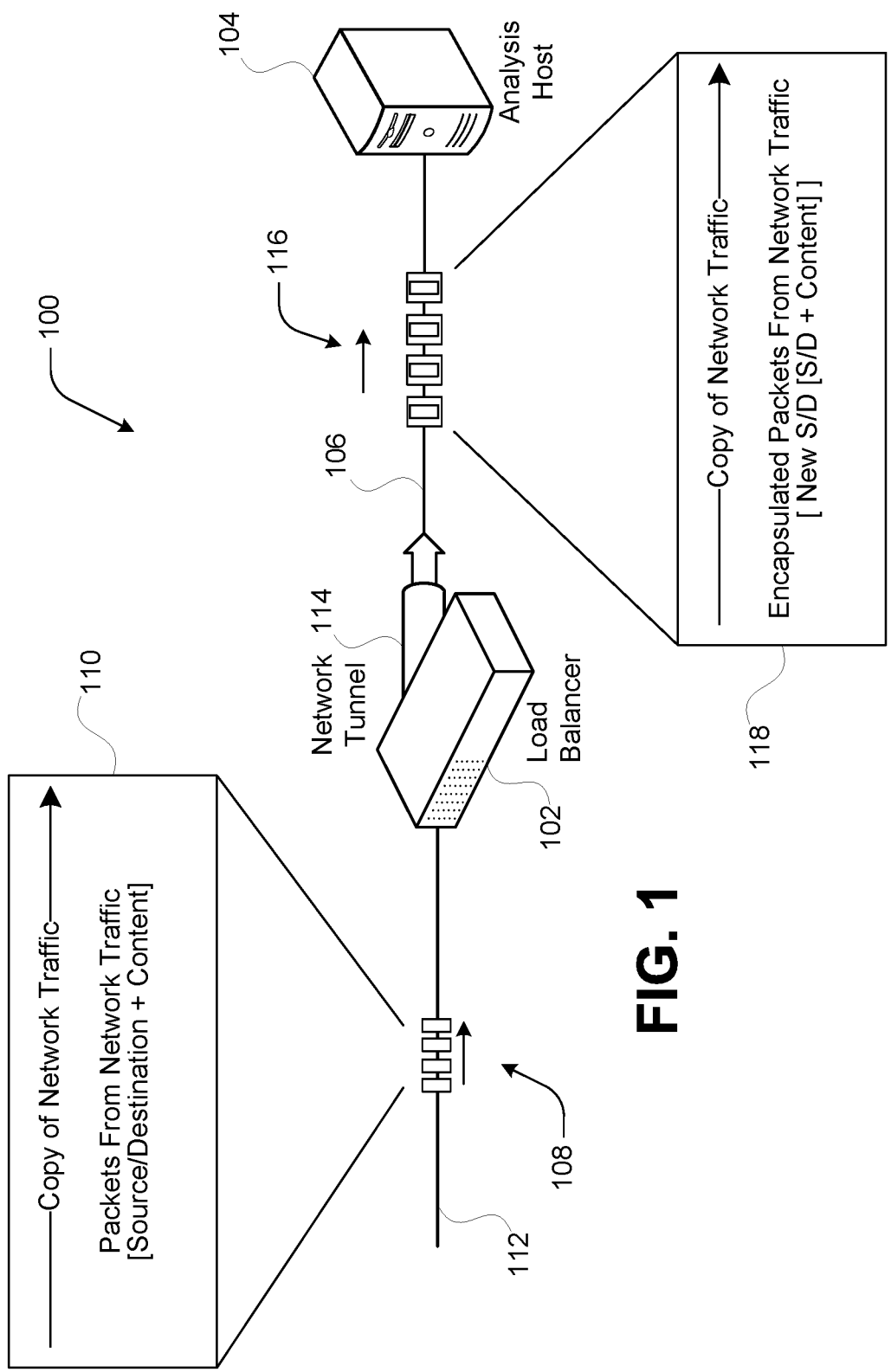
FIG. 1 illustrates an example system that comprises a load balancer that is operably connected to an analysis host via a first network connection where the load balancer can receive data packets of network traffic via a second network connection.

The following disclosure describes techniques for enhancing network security through the detection of potentially malicious network traffic. Some examples include receiving a copy of network traffic at a network switch from a split on a network link, with the switch being configured to selectively distribute the copied network traffic to a group of analysis hosts in a stateful manner. For example, the switch can identify the source and destination of the packets of copied network traffic and send packets from the same source-destination pair to the same analysis host so that conversations between the source-destination pair can be analyzed by the analysis host. In other words, where packets have source A and destination B or source B and destination A, such packets can be sent to the same analysis host for analysis.

The switch can be configured to generate a network tunnel for copied network traffic received at the switch by encapsulating copied packets of network traffic in new packets, where the copied packets become the payload of new second packets. The new second packets can include a header that identifies the destination of the second packets as a selected analysis host of a set of analysis hosts. Additionally, the headers of the second packets can identify a false source of the new second packets as a device associated with the network link that the split is operably coupled with. For example, the headers of the new second packets can identify a firewall associated with the network link as the source of the new second packets. Such a false source can be used as an identifier of a network link or portion of the network from which the copied network traffic originated.

The analysis host can identify potentially suspicious network activity based on source-destination information from the headers of the received new second packets and the payloads of the received second packets, where the payloads of the new second packets include the copied packets from network traffic. For example, the analysis host can determine whether potentially suspicious network activity is present based on the false source of the new second packets identifying a network location along with the destination and source of the copied packets, which is preserved by way of being encapsulated in the payload of the new second packets. Additionally, the content of the payload of the copied packets can also be used to determine whether potentially suspicious activity is present in the network traffic.

For example, where the destination and/or source of copied packets is considered to be prohibited or abnormal on the network link location identified in the header of new second packets, then the network traffic associated with such packets can be considered to be potentially suspicious. In another example, if the payload of copied packets is considered to be prohibited or abnormal on the network link location identified in the header of new second packets, then the network traffic associated with such packets can be considered to be potentially suspicious.

While various suitable devices can be used to distribute packets of copied network traffic to a set of analysis hosts, including a load balancer, in some examples it can be desirable to configure a network switch to perform such functions because a network switch can be substantially less expensive, less complex and faster than devices such as a load balancer.

Configuring a switch to distribute packets of copied network traffic to a set of analysis hosts can be done in various suitable ways. For example, since the switch is not the true destination for such copied packets, the switch can be configured so that packets with any destination can be received and handled by the switch. Additionally, the switch can be configured to handle the destination and source of the copied packets in a symmetrical and stateful manner such that communications between a pair of devices will be sent to the same analysis host regardless of whether a given device of the pair is the destination or source of a packet.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Turning to FIG. 1, a system 100 is illustrated that comprises a load balancer 102 that is operably connected to an analysis host 104 via a first network connection 106. In various examples, a load balancer can be any suitable device that acts as a reverse proxy and distributes network or application traffic across a number of servers or other target devices. In some examples, the load balancer can comprise a network switch including a multiport network bridge that uses hardware addresses to process and forward data at the data link layer (layer 2) and/or at the network layer (layer 3) by additionally incorporating routing functionality that can use IP addresses, or the like, to perform packet forwarding.

As shown in this example system 100 of FIG. 1, the load balancer 102 can receive data packets 108 of copy of network traffic 110 via a second network connection 112. The load balancer 102 can encapsulate the received data packets 108 via a network tunnel 114 to generate encapsulated data packets 116, which can define an encapsulated copy of network traffic 118. The generated encapsulated data packets 116 defining the encapsulated copy of network traffic 118 can be sent to the analysis host 104.

As illustrated in FIG. 1, the copy of network traffic 110 can comprise the data packets 108 being communicated over the second network connection 112 from a source to the load balancer 102. The data packets 108 can comprise metadata indicating a source and destination of a given data packet 108 and the content or payload of the data packet 108.

A source and destination of a data packet 108 can comprise any suitable address that corresponds to a device, system, or the like, which can be a physical or virtual computing device or system in some examples. Such a source and destination can be indicated in various suitable ways, including via an Internet Protocol (IP) address, a Medium Access Control (MAC) address, or other suitable identifier, which can be unique, non-unique and can temporary or permanent for a given device or location. In one example, copy of network traffic 110 can comprise communications between a device and a server where the device is requesting hosted content from the server and the server sends hosted content to the device via data packets 108. In such an example, content can comprise a portion of an image, video, Hypertext Markup Language (HTML) data, or the like. Accordingly, network traffic can comprise messages or packets from the server to the device and from the device to the server.

The load balancer 102 can comprise various suitable devices that are operable to receive data packets 108 from network traffic 110; encapsulate the data packets to generate an encapsulated copy of network traffic 118 comprising encapsulated data packets 116; and communicate the encapsulated data packets 116 to an analysis host 104. For example, while the load balancer 102 can comprise a load balancer device, in some examples as discussed in more detail herein, a data switch can be configured to act as a load balancer 102. The load balancer 102 can comprise suitable hardware and/or software to achieve such desired functionalities.

Use of a network tunnel 114 or encapsulation of data packets 108 of the copy of network traffic 110 can generate an encapsulated copy of network traffic 118 comprising encapsulated data packets 116. For example, as illustrated and discussed in more detail herein (e.g., see FIG. 3), encapsulation of data packets 108 can comprise taking a given data packet 108 and generating a second encapsulated data packet 116 where the content or payload of the second encapsulated data packet 116 comprises the first data packet 108 and the second encapsulated data packet 116 includes new source and destination metadata.

While various examples of a network tunneling or encapsulation can include encapsulation having a 1:1 ratio where each encapsulated data packet 116 comprises one packet 108 of network traffic 110, further examples can include encapsulation of other suitable types or ratios. For example, some encapsulation or network tunneling can combine two or more data packets 108 into the content or payload of an encapsulated data packet 116. In another example, a given data packet 108 can be split into two or more portions that can comprise two or more encapsulated data packets 116. Also, such a manner of encapsulation can remain the same or can be varied. For example, over a period of time, some encapsulated data packets 116 can comprise a single data packet 108, multiple data packets 108, or a portion of one or more data packets 108.

Encapsulation of network traffic 110, or use of a network tunnel, can comprise one or more communication protocol. For example, the data packets 108 coming to the load balancer 102 can use a first communication protocol and encapsulated data packets 116 can use a second communication protocol that is different than the first communication protocol. Such examples can be desirable where devices or communication channels of a network are unable to handle certain types of communication protocols whereas other devices or communication channels are able to handle these types of communication protocols. For example, where the load balancer 102 or first communication channel 106 is unable to handle a first communication protocol used by the data packets 108 of the copy of network traffic 110, then such data packets 108 can be encapsulated using a communication protocol that the load balancer 102 and first communication channel are configured to handle so that the data packets 108 of the copy of network traffic 110 can be communicated to the analysis host 104.

However, in further examples, encapsulation or use of a network tunnel 114 can employ the same communication protocol. For example, the data packets 108 coming to the load balancer 102 can use a first communication protocol and encapsulated data packets 116 can also use the first communication protocol to encapsulate the data packets 108 to generate the encapsulated data packets 116. Such examples can be desirable where metadata of the data packets 108 such as source and destination identifiers are to be preserved for use by the analysis host 104 and where such metadata would otherwise be lost without encapsulation or use of a network tunnel 114. In other words, encapsulation or a network tunnel 114 can be used to preserve a portion of the data packets 108 of a copy of network traffic 110 that would be lost if the packets were not encapsulated or communicated via a network tunnel 114.

The first and second network connections 106, 112 can comprise various suitable network components, including wired and/or wireless communication channels. For example, one or both of the first and second network connections 106, 112 can comprise a WiFi network, the Internet, a Local Area Network (LAN), Wide Area Network (WAN), a Bluetooth network, a fiber-optic network, or the like.

The analysis host 104 can comprise various suitable devices, which can comprise one or more virtual or non-virtual computing devices. As discussed in more detail, the analysis host 104 can be configured to receive encapsulated data packets 116 of encapsulated copy of network traffic 118, de-encapsulate the encapsulated data packets 116 of encapsulated copy of network traffic 118 and analyze the de-encapsulated packets. For example, such an analysis can include determining whether any aspects of one or more de-encapsulated data packet indicate the potential presence of malicious or undesirable traffic on the network.

Figure 2:
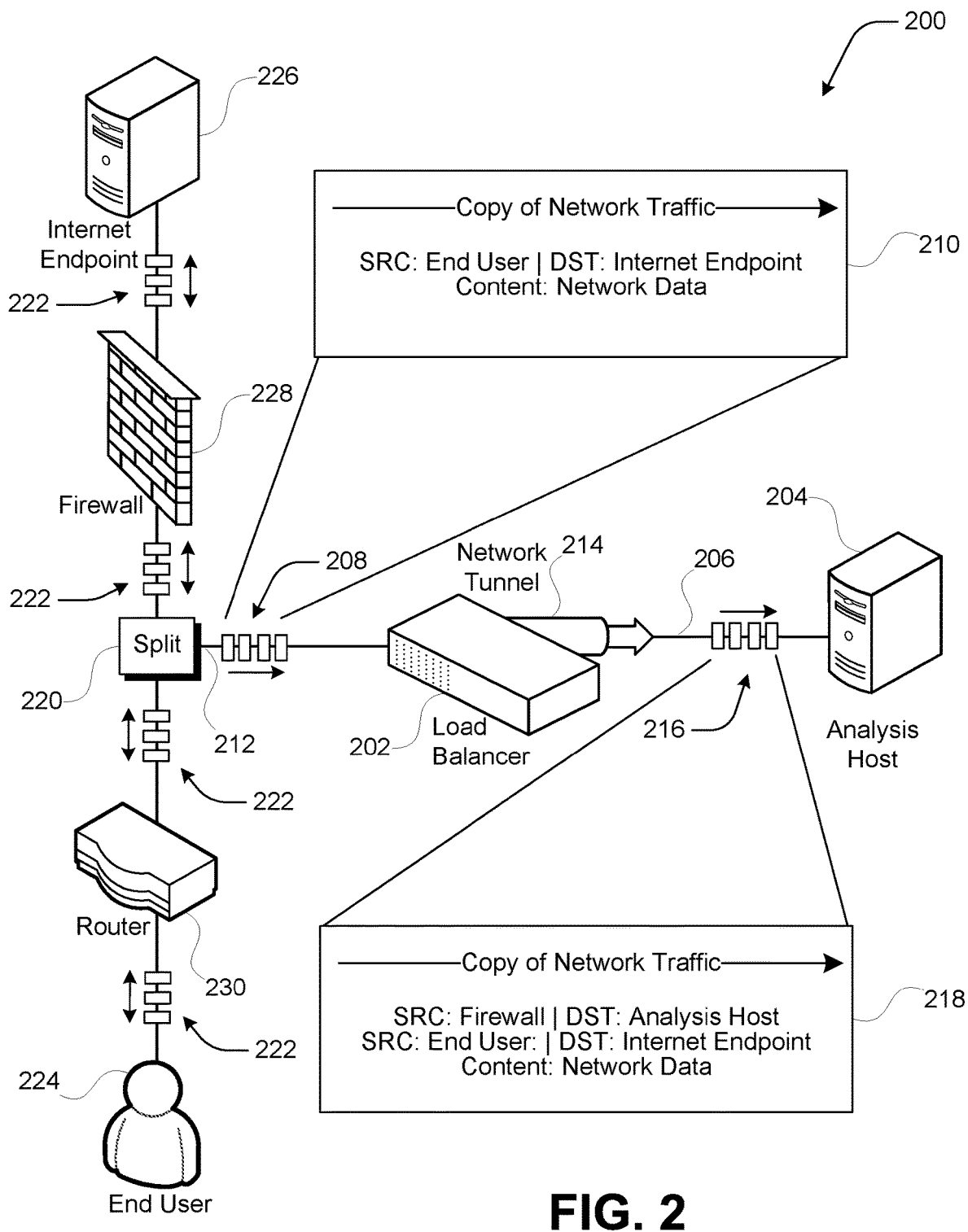
FIG. 2 illustrates another example system that comprises a load balancer that is operably connected to an analysis host via a first network connection where the load balancer can receive data packets of copied network traffic from a split via a second network connection.

Turning to FIG. 2, a system 200 is illustrated that comprises a load balancer 202 that is operably connected to an analysis host 204 via a first network connection 206. As shown in this example system 200 of FIG. 2, the load balancer 202 can receive data packets 208 of network traffic 210 via a second network connection 212. The load balancer 202 can encapsulate the received data packets 208 via a network tunnel 214 to generate encapsulated data packets 216, which can define an encapsulated copy of network traffic 218. The generated encapsulated data packets 216 defining the encapsulated copy of network traffic 218 can be sent to the analysis host 204.

In various examples, the load balancer 202, analysis host 204, first and second network connections 206, 212, data packets 208 of the copy of network traffic 210 and encapsulated data packets 216 of the encapsulated copy of network traffic 218 of FIG. 2 can correspond to or be the same as the load balancer 102, analysis host 104, first and second network connection 106, 112, data packets 108 of the copy of network traffic 110 and encapsulated data packets 116 of the encapsulated copy of network traffic 118 of FIG. 1.

As shown in FIG. 2, the data packets 208 of the copy of network traffic 210 can originate from a split 220 that duplicates the network traffic 222 of communications between an end user 224 and an internet endpoint 226 that are operably connected by a network that comprises a firewall 228 and a router 230. For example, the internet endpoint 226 can comprise a webserver that hosts a webpage and related content such as images and videos. Where the end user 224 desires to access the webpage and the related content, the end user 224, via a user device, can use a communication protocol (e.g., TCP/IP) to request content from the internet endpoint 226 and the internet endpoint 226 can reply by sending the desired content to the end user 224 via the network comprising the firewall 228 and router 230. Such communications or network traffic can comprise network traffic 222, which can include communications from the end user 224 to the internet endpoint 226 and communications from the internet endpoint 226 to the end user 224.

The split 220 can be configured to duplicate such network traffic 222 coming to the split 220 from the end user 224 via the router 230 or from the internet endpoint 226 via the firewall 228. In other words, the split 220 can generate the copied data packets 208 of the copy of network traffic 210 from network traffic 222 that come to the split 220. The split 220 can facilitate duplication of the network traffic 222 in various suitable ways. For example, the split 220 can comprise an optical or electrical tap that physically duplicates light or electrical signals received by the split 220 via optical or electrical communication lines. In another example, the split 220 can receive network traffic 222, store the network traffic 222 in a memory, and generate the copy of data packets 208 of the copy of network traffic 210 from the data packets stored in the memory.

As shown in FIG. 2, the network traffic 222 and copy of the data packets 208 originating from the split 220 can comprise source metadata (SRC) that indicates the source of the packet being the end user 224 and the destination of the packet being internet endpoint 226. Alternatively, the source metadata (SRC) can indicate the source of the packet being the internet endpoint 226 and the destination of the packet being the end user 224. Additionally, the packets can comprise network data or a payload, which can comprise messages or data being communicated to or from the end user 224 or internet endpoint 226.

The data packets 208 of the copy of network traffic 210 can be communicated to the load balancer 202, which can encapsulate the data packets 208 of the copy of network traffic 210 via a network tunnel 214 to generate the encapsulated data packets 216 of the encapsulated copy of network traffic 218. The generated encapsulated data packets 216 of the encapsulated copy of network traffic 218 can comprise new source metadata (SRC) indicating the source of the encapsulated data packet 216 being the firewall 228 and the destination being the analysis host 204. The encapsulated copy of the network traffic can also include the network data and source metadata from the packet that was encapsulated.

For example, the load balancer 202 can be configured to implement a network tunnel 214 that generates or fakes new source metadata that indicates that the packet came from the firewall 228 and has a destination of the analysis host 204, which can facilitate communication of that packet to the analysis host 204. Additionally, generating a new header and encapsulating the packet can be desirable because it can preserve the header from the original data packet 208 indicting that the end user 224 and internet endpoint 226 are the destination or source of the original data packet 208.

As discussed in more detail herein, such preserved information can be used by the analysis host 204 to determine whether the copy of network traffic 210 meets criteria for potentially suspicious activity. Additionally, the header information indicating the firewall 228 as the source can be used to determine whether the copy network traffic 210 meets criteria for potentially suspicious activity. For example, where network traffic 222 between the end user 224 and internet endpoint 226 is not expected or is prohibited on a communication channel that includes the firewall 228, then the analysis host 204 can determine that such network traffic 222 is potentially suspicious based at least in part on the encapsulated data packets 216 of the encapsulated copy of network traffic 218 indicating the firewall 228, first end user 224 and internet endpoint 226 being associated with the network traffic 222.

Accordingly, various examples include modifying a copy of network traffic 208 to preserve information about the destination and source of the original network traffic 222 and also indicating a portion of a communication channel that handled network traffic 222 between the source and destination. While the example of FIG. 2 illustrates encapsulating a copy of network traffic 208 to include a header indicating a firewall 228 being a source, further examples can include generating a header that indicates one or more suitable, node, device, or the like, of a communication channel, including the router 230, or the like.

Figure 3:
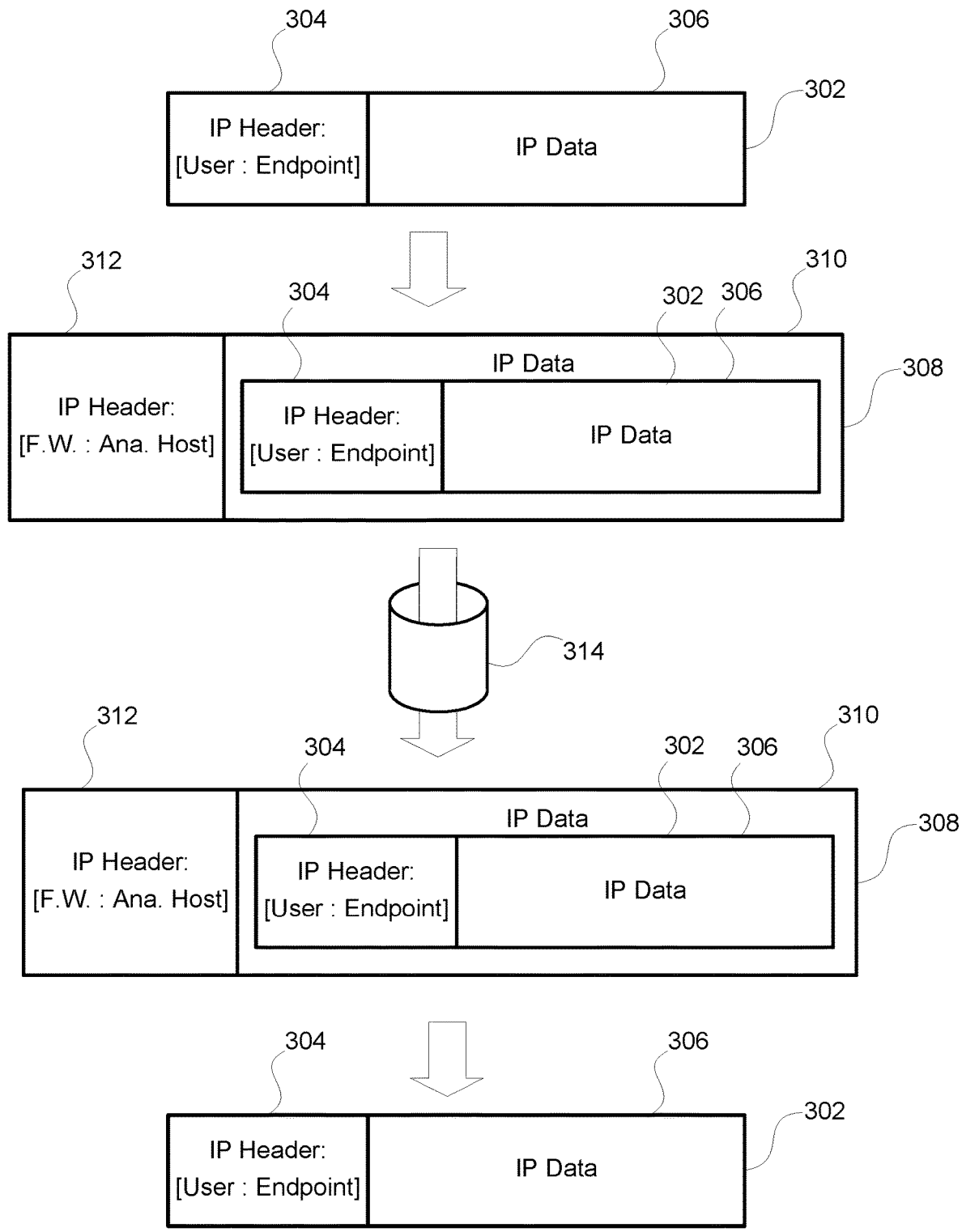
FIG. 3 illustrates a block diagram of a method of encapsulating, sending and de-encapsulating data packets in accordance with one example.

Turning to FIG. 3, a method of encapsulating, sending and de-encapsulating data packets is illustrated. Beginning at the top of the top of FIG. 3, a data packet 302 is shown comprising a header 304 indicating a user and an endpoint and a payload 306 that comprises IP data. In various examples, the header 304 can be used to route the data packet 302 from a destination to an endpoint. For example, where a user is sending a data payload (e.g., an image, text, or the like) to an endpoint, the user can generate a data packet 302 that includes a packet payload 306 that comprise some or all of the data payload being sent to the endpoint. Where the full data payload is large, for example, it can be broken up into multiple packet payloads 306. Packet payloads 306 can be associated with a header 304 that indicates the sending user and a destination endpoint. In one example, IP protocol can be used to generate data packets 302 and the user and endpoint indicator can comprise an IP address for a computing device associated with the user and endpoint. The user address can be used to indicate to the endpoint where the packet originated from and where to send replies to the data packet 302. The endpoint address can be used by a communication network to communicate the data packet 302 to the endpoint. As discussed herein such a communication network can include various suitable devices, including routers, firewalls, and the like. For example, a communication network can comprise the Internet, a Local Area Network (LAN), or the like.

As shown in FIG. 3, the data packet 302 can be encapsulated in a second packet 308. In other words, instead of including a payload such as a portion of an image, text or the like, the second packet payload 310 can comprise the first data packet 302, including the first packet payload 306 and the first packet header 304. The second packet 308 can also include a header 312, which in this example is shown comprising an IP header that identifies a firewall (F.W.) and analysis host (Ana. Host.) as a source and destination.

As discussed herein, such encapsulation of a first data packet 302 into the payload 310 of a second data packet 308 can be desirable for preserving information of the header 304 of the first data packet 302 and to generate a faked source of the second packet 308 (e.g., a firewall), which can provide an indication of a communication link on which the data packet 302 (or an original of a copied data packet 302) traveled. Additionally, adding the analysis host as the destination in the second packet header 312 can facilitate communication of the second packet 308 to a desired analysis host.

The second packet 308 can be communicated to the destination analysis host via a communication channel 314, which in this example can be referred to as a network tunnel. For example, where an encapsulated packet is communicated via a network, such communication can be referred to as a "network tunnel" because in some examples, the communication protocol of the first data packet 302 is incompatible with the communication protocol of the communication channel 314, and encapsulating the first data packet 302 in the second packet 308 via a communication protocol compatible with the communication channel 314 can allow the first data packet 302 to "tunnel" through a communication channel 314 that the first data packet 302 is not compatible with. Additionally, such encapsulation or tunneling can be desirable to provide security for the first packet and/or to preserve and add information to the communications as discussed herein. In such examples, a communication protocol of the first data packet 302 may or may not be compatible with the communication channel 314.

As shown in FIG. 3, the second packet 308 can be sent via the communication channel to a destination device (e.g., an analysis host), where the second packet 308 can be de-encapsulated such that the first data packet 302 is extracted from the second packet payload 310, which can make the first packet payload 306 and first packet header 304 available to the destination device. Accordingly, the destination device can obtain a set of information from the second packet 308, including information from the second packet header 312, information from the first packet header 304 and information from the first packet payload 306.

As discussed in more detail herein, such information from the second packet header 312, information from the first packet header 304 and information from the first packet payload 306 can be used by an analysis host to determine whether the first data packet 302, or a set of communications that the first data packet 302 is a part of, meet criteria or a threshold that would qualify such communications as being potentially suspicious.

For example, where a set of communications including one or more packet originate from a communication link where certain types of data should not be transmitted (e.g., credit card data), then a given set of communications originating from that link can be considered suspicious if the first packet payload 306 is identified as including a prohibited type of data. In another example, where the identity or type of a sender or destination of communications is prohibited on a given communication link, then a given set of communications originating from that link can be considered suspicious if the destination and/or source of a given packet or set of packets includes a prohibited user, which can be identified from the first packet header 304. For example, if only employee or registered users are allowed to communicate via a given communication link, then communications on that link having a destination or source with an unregistered user or non-employee user can be considered suspicious.

Figure 4:
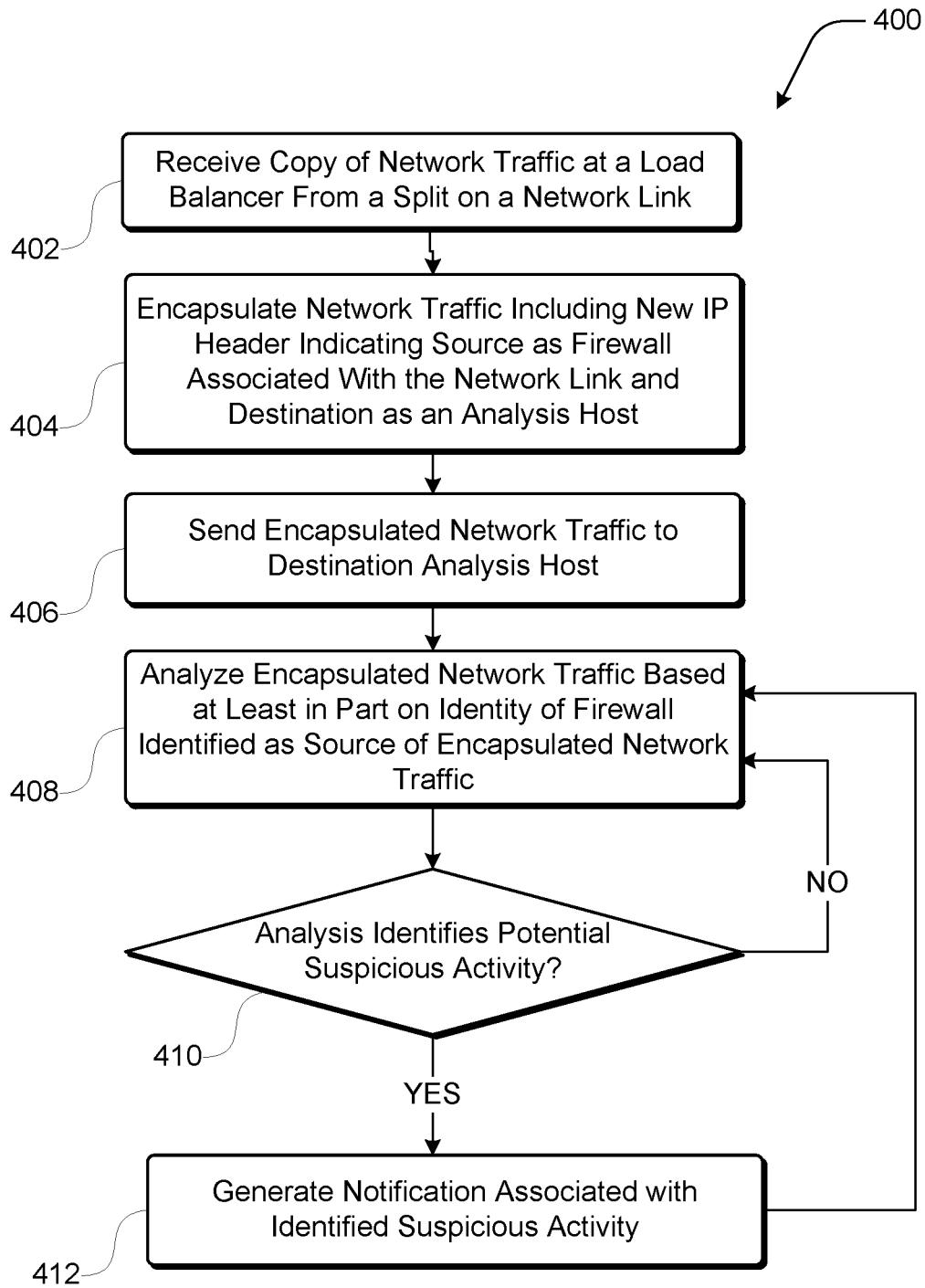
FIG. 4 illustrates an example method of identifying and generating a notification for potentially suspicious activity.

FIG. 4 illustrates a method 400 of identifying and generating a notification for potentially suspicious activity. The method 400 begins, at 402, where a copy of network traffic is received at a load balancer from a split on a network link. For example, as discussed herein, a portion of a network link can comprise a split that can copy network traffic communicated over the network link and send the copied network traffic to a load balancer, which in some examples can comprise a switch. Various types of network communications of various suitable protocols can be copied, including packet-based communication protocols such as TCP/IP. However, the examples discussed herein relating protocols such as TCP/IP should not be construed to be limiting on the wide variety of communications protocols that can be used with the systems and methods disclosed herein.

At 404, the network traffic is encapsulated including a new IP header indicating the packet source as a firewall associated with the network link and with the packet destination as an analysis host, and at 406, the encapsulated network traffic is sent to the destination analysis host. For example, as illustrated and discussed herein (e.g., FIG. 3), a first packet can comprise the payload of a second packet and the second packet can comprise a new packet header that indicates the packet source as a firewall and a destination as an analysis host. Such encapsulation and/or communication to the analysis host can be referred to as a "network tunnel" or "network tunneling."

At 408 the encapsulated network traffic is analyzed at the analysis host based at least in part on the identity of the firewall identified as the source of the encapsulated network traffic, and at 410, a determination is made whether the analysis identifies suspicious activity. For example, as discussed herein, a portion of a communication link (e.g., a firewall) can be faked as the source of the encapsulated network traffic, which can serve as an identifier of the communication link. In other words, encapsulating network traffic can allow a network link source of the traffic to be included in the encapsulated network traffic, which can be used to analyze the network traffic to determine whether the network traffic is potentially suspicious. For example, such analysis can include determining whether prohibited or suspicious types of communications or types of communication sources, or types of communication destinations, or the like are on a network link. In some examples, determining whether suspicious network traffic is present can include analysis of single packets or can include analysis of a plurality of packets as a set.

If at 410, a determination is made that suspicious communications are not present, then the method 400 cycles back to 408, where encapsulated network traffic continues to be analyzed. However, if at 410 a determination is made that potentially suspicious activity has been identified, then at 412, a notification is generated associated with the suspicious activity. For example, where suspicious communications on a network are identified, then a notification can be sent to a network administrator, which can allow the network administrator to investigate the potentially suspicious network traffic and take action to block, prevent or monitor such network traffic if necessary.

In further examples, actions can be taken automatically without user interaction, which can include blocking a user, blocking communications from a given source, blocking communications to a given destination, changing security settings for a given network link, or portions of the network link, blocking access to network resources that are the subject of certain communications, and the like.

Additionally, while various examples include identifying potentially suspicious activity in network traffic, further examples can include identifying and/or troubleshooting issues with network communications. In other words, network traffic can be analyzed to identify locations, devices, or applications within a network that are not operating within desired operating parameters. For example, if a type of network traffic or network traffic from certain users is not being properly handled or not reaching a desired destination, logs at an analysis host can be used to troubleshoot such issues or the analysis host can identify such issues and generate an alert regarding such issues.

Figure 5:
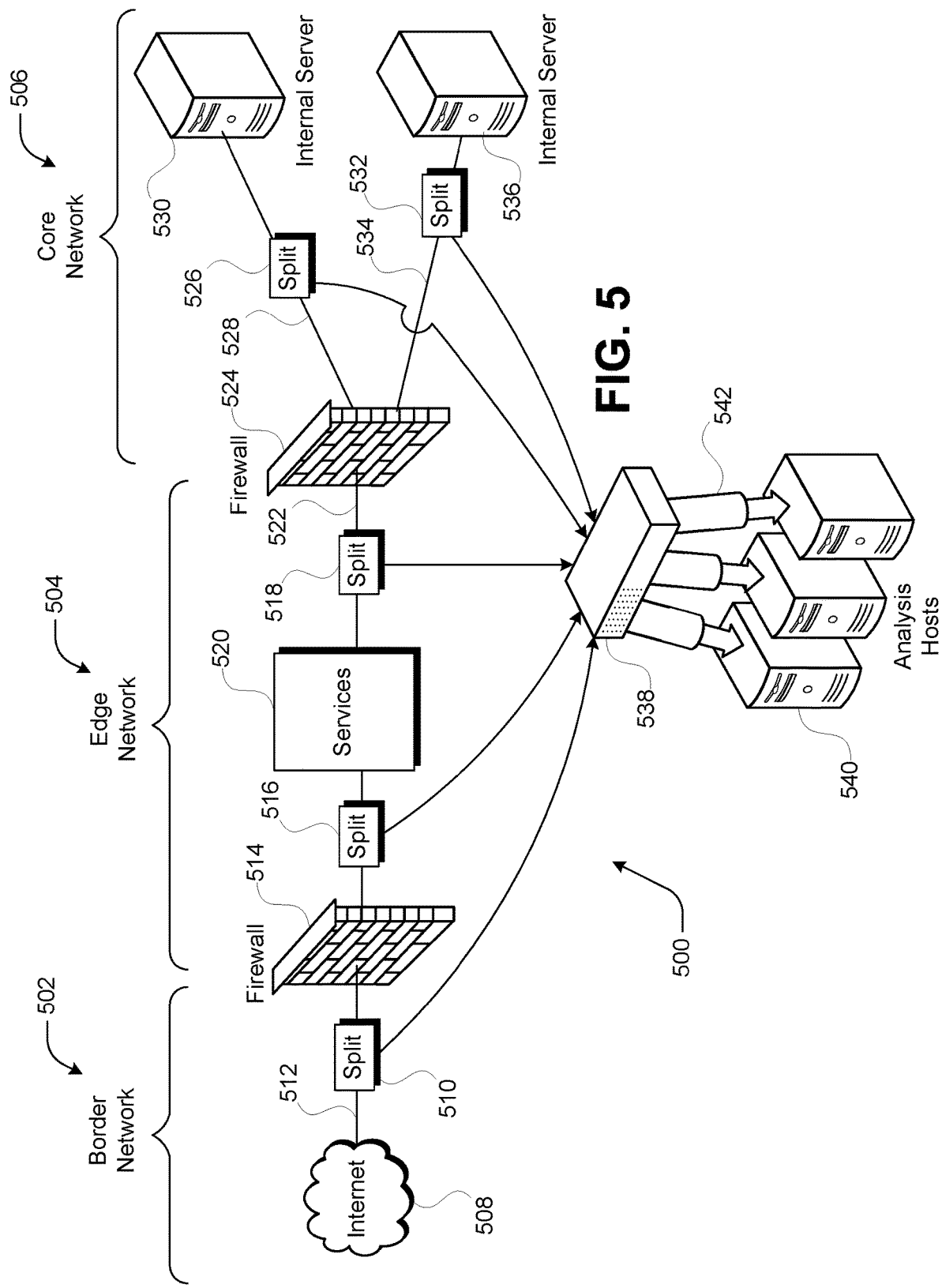
FIG. 5 illustrates and example network that comprises a border network portion, an edge network portion and a core network portion with splits in these portions of the network sending copied network traffic to a load balancer, which distributes the network traffic to a set of analysis hosts.

FIG. 5 illustrates and example network 500 that comprises a border network portion 502, an edge network portion 504 and a core network portion 506. The border network portion 502 in this example comprises the internet 508 and a first split 510 on a first network link 512 between the internet 508 and a first firewall 514. The edge network portion 504 in this example comprises a first and second split 516, 518 and a set of services 520, which are disposed on a second network link 522 between the first firewall 514 and a second firewall 524. The core network 506 in this example comprises a fourth split 526 on a third network link 528 between a first internal server 530 and the second firewall 524. The core network 506 in this example further comprises a fifth split 532 on a fourth network link 534 between a second internal server 536 and the second firewall 524.

In the example network 500 of FIG. 5, the splits 510, 516, 518, 526, 532 are operably connected to a load balancer 538, which is configured to receive a copy of network traffic passing through the splits 510, 516, 518, 526, 532 on the respective network links 512, 522, 528, 534. The load balancer 538 is configured to send the portions of the received network traffic received from the splits 510, 516, 518, 526, 532 to a plurality of analysis hosts 540 via network tunnels 542. In other words, the load balancer 538 is configured to encapsulate the received network traffic and selectively send the encapsulated network traffic to the analysis hosts 540. In various examples, packets of network traffic received from the splits 510, 516, 518, 526, 532 can be sorted and sent to one of the plurality of analysis hosts 540, with a given packet only being sent to a single analysis host 540. However, in further embodiments, a given packet of network traffic can be sent to a plurality of analysis hosts 540. Additionally, in some examples, network traffic from respective splits 510, 516, 518, 526, 532 can be encapsulated in separate respective network tunnels 542 and sent to an analysis host 540.

As discussed herein, encapsulation of packets of network traffic received from the splits 510, 516, 518, 526, 532 can be encapsulated with a new header that indicates a selected destination analysis host and that includes a false source associated with a location or portion of the network 500. For example, the false source can include devices such as the first and second firewall 514, 524. Additionally, false sources can be associated with a device of the network and can also include an identifier specifying a specific network link or portion thereof. For example, network traffic originating from the fourth and fifth split 526, 532 can both identify the second firewall 524 as the source when encapsulated, and in some embodiments the identified address of the second firewall 524 can comprise an identifier respectively indicating that the network traffic respectively originated from the third and fourth network links 528, 534.

Additionally, in further examples, a dummy address or source can be added to the encapsulated network traffic that is not associated with a specific device of the network 500, but that can be used to identify a given network link or portion of the network 500 from which the network traffic originated. For example, network traffic originating from the fourth and fifth split 526, 532 can be encapsulated with a header indicating a source that does not correspond to the second firewall 524 (or other device in the network 500, but that can be used to identify that the network traffic originated from the third and fourth network links 528, 534.

As discussed herein, identifying potentially suspicious network traffic can be done in various ways and based on various criteria. For example, the example network 500 of FIG. 5 includes border, edge, and core network portions 502, 504, 506 that are insulated from an external network like the internet 508 by one or more respective layers of firewalls 514, 524. In such a network configuration, certain types of network traffic and/or network traffic having certain sources or destinations can be prohibited, discouraged, or atypical on certain portions of the network 500. In one example, for security purposes, network traffic from internal servers 530, 536 in the core network should not be directly sent to users in the border network portion 502 via the internet 508. Accordingly, some examples can identify network traffic as suspicious if it originates from the fourth or fifth split 526, 532 within the core network 506 and has a destination or source that is in the border network portion 502. Similarly, some examples can identify network traffic as suspicious if it originates from the first split 510 at the border network portion 502 and has a destination or source that is in the core network 506.

Figure 6:
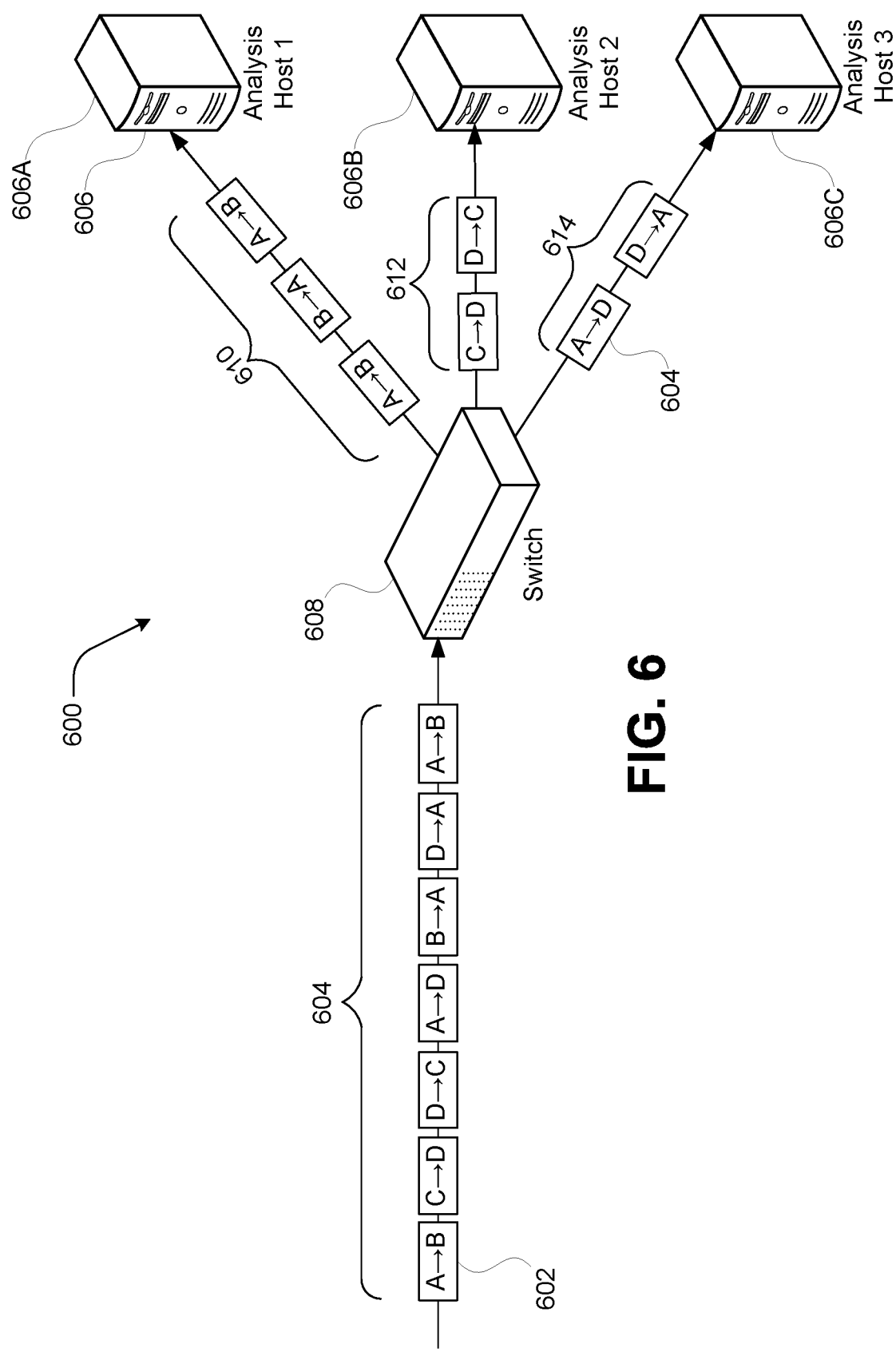
FIG. 6 illustrates one example of how packets of copied network traffic can be selectively sent to one of a plurality of analysis hosts via a switch based on an identified destination-source pair.

FIG. 6 illustrates one example of how packets 602 of copied network traffic 604 can be selectively sent to one of a plurality of analysis hosts 606 via a switch 608. In this example, the original set of copied network traffic 604 comprises a plurality of packets 602 that are sent to the switch 608, which can determine how these packets 602 will be distributed to the analysis hosts 606. The packets 602 in this example are shown including a destination and source, where the source is indicated first, with an arrow pointing to the destination indicating the path from source to destination. In this example, network traffic 604 is shown having a potential source or destination of A, B, C, or D.

In various examples, it can be desirable for packets 602 of network traffic 604 to be distributed to analysis hosts 606 in a stateful manner. In other words, it can be desirable in various examples for all packets between a given destination and source to be sent to the same analysis host 606, which can allow the analysis host to identify characteristics of one or more conversation or session between a given destination and source. This can be desirable because analysis of one or more conversation or session between a given destination or source can provide insight into whether the communications are potentially suspicious, which might not be apparent from individual packets or portions of a conversation or session alone. For example, because the inspection hosts do not store state in some examples, traffic between the same hosts can be routed to the same analysis host 606 so that a conversation between the destination-source pair can be reconstructed at a single analysis host 606, converted into a log, and then analyzed by a security intelligence platform.

For example, as illustrated in the example of FIG. 6, the switch 608 can send all network traffic 610 having the source-destination pair of A and B to the first analysis host 606A. In other words, network traffic 610 where the source is A and destination is B and where the source is B and destination is A can be selectively sent to the first analysis host 606A. Additionally, the switch 608 can send network traffic 612 having source-destination pair of C and D to the second analysis host 606B. Also, the switch 608 can send network traffic 614 having source-destination pair of A and D to the third analysis host 606C.

In some examples, different conversations or sessions between a given source-destination pair can be sent to different analysis hosts 606, whereas in other examples, conversations or sessions between a given source-destination pair can always be sent to the same analysis host 606 for a period of time. Also, while a switch 608 is show in the example system 600 of FIG. 6, further examples, can comprise any suitable device that is operable to perform such functions of selectively distributing packets 602 of network traffic 604 to analysis hosts 606 as discussed herein. Additionally, in various examples, the switch 608 can be configured to encapsulate the network traffic 604 as described herein.

In various examples, it can be desirable to configure a switch 608 to distribute network traffic 604 to analysis hosts 606 as described herein. For example, a conventional load balancer can be substantially more complex and can be substantially more expensive than a conventional network switch (e.g., load balancers can cost upwards of ten times as much as a network switch). Accordingly, in various examples, it can be desirable to configure a network switch 608 to distribute network traffic 604 to analysis hosts 606 as described herein instead of a conventional load balancer.

Additionally, switches and load balancers can operate differently. For example, a load balancer can be a device that acts as a reverse proxy and distributes network or application traffic across a number of servers or other target devices. In some uses, load balancers can improve the overall performance of applications by decreasing the burden on servers associated with managing and maintaining application and network sessions, as well as by performing application-specific tasks. To provide such robust and complex functionalities, load balancers can act upon the network and transport layer (Open Systems Interconnection (OSI) layers 3 and 4) protocols (e.g., IP, TCP, FTP, UDP) or can distribute requests based upon data found in application layer (layer 7) protocols (e.g., HTTP).

In contrast, a network switch can comprise a multiport network bridge that uses hardware addresses to process and forward data at the data link layer (layer 2) and/or at the network layer (layer 3) by additionally incorporating routing functionality that can use IP addresses, or the like, to perform packet forwarding. Accordingly, because some switches are unable to act on OSI layers above layer 3, switches of some examples may be unable to forward network traffic in a stateful manner and for identifying potentially suspicious activity without the novel configuration and methods discussed herein.

Figure 7:
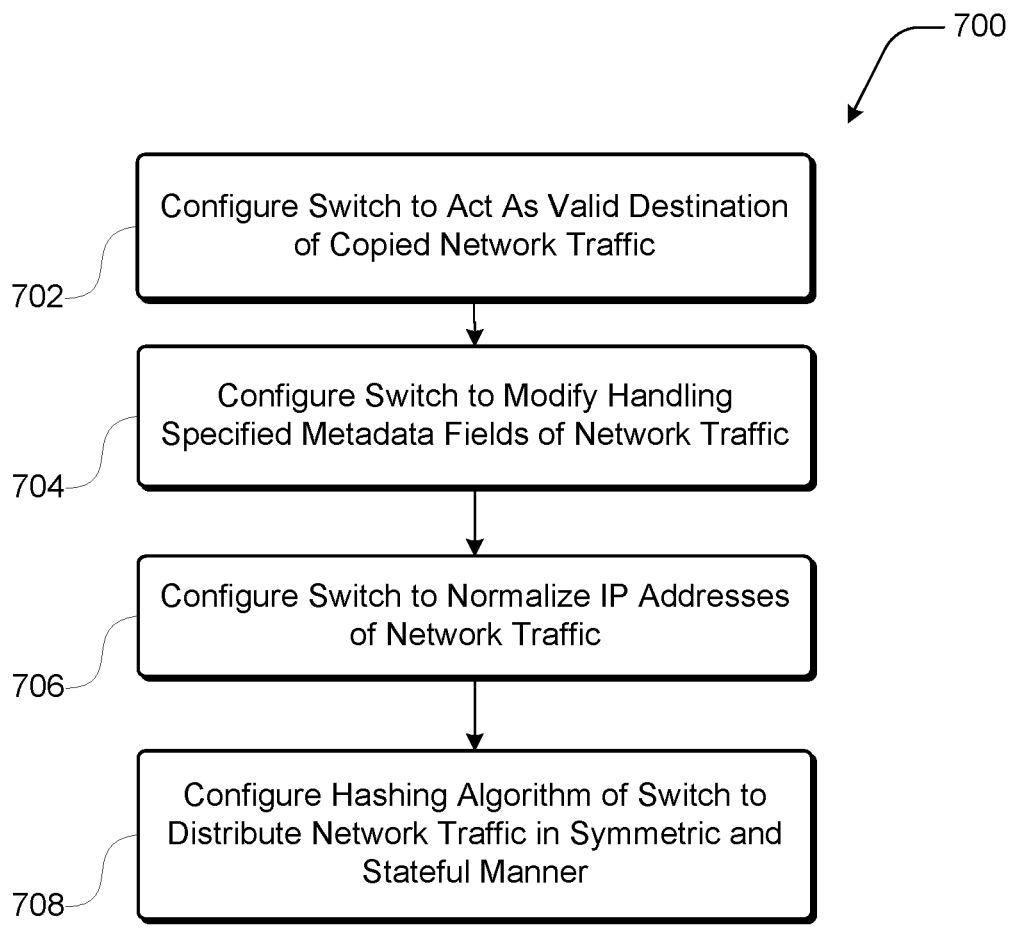
FIG. 7 illustrates an example method of configuring a switch to distribute packets of copied network traffic in a stateful manner.

FIG. 7 illustrates an example method 700 of configuring a switch to distribute packets of copied network traffic in a stateful manner. For example, the method 700 can be performed on or by the load balancer 102, 202, 538 of FIG. 1, 2, or 5 or by the switch 608 of FIG. 6. The method 700 begins at 702 where the switch is configured to act as a valid destination of copied network traffic. For example, where network traffic is copied from a split as described herein (see e.g., split 220, 510 of FIGS. 2, and 5), in various examples, the switch is not the true destination of the network traffic and would not be operable to receive and handle the copied network traffic under normal operating conditions. Accordingly, in various examples, the switch can be configured to be a valid destination such that the network traffic can be sent to, received by, and handled by the switch. For example, the switch can be configured to have a wildcard MAC address that makes the switch a valid destination for the copied network traffic. In one implementation, MAC addresses can be completely masked such that all incoming MAC addresses are considered to be matching.

At 704, the switch is configured to modify handling of specified metadata fields of the network traffic, and at 706, the switch is configured to normalize IP addresses of the network traffic. For example, the switch and/or an Equal-Cost Multi-Path (ECMP) routing registry associated with the switch can be configured to handle the metadata fields of the packets in a different order when making routing calculations, to ignore certain metadata fields of the network traffic, and the like. Such configuration can allow source-destination pairs to be handled symmetrically such that packets from source A to destination B and packets from source B to destination A can be routed to the same location. Additionally, in some examples, the switch can be configured for layer 3 to be terminated for all packets. In some examples, MAC address of packets can be ignored. In further examples, the switch can be configured to handle all packets as a layer 3 packet, regardless of packet type. In some examples, a network access control list (ACL) can be used to route packets.

At 708, a hashing algorithm of the switch is configured to distribute the network traffic in a symmetric and stateful manner. For example, as discussed herein packets to and from a given destination-source pair can be distributed to the same analysis host.

Figure 8:
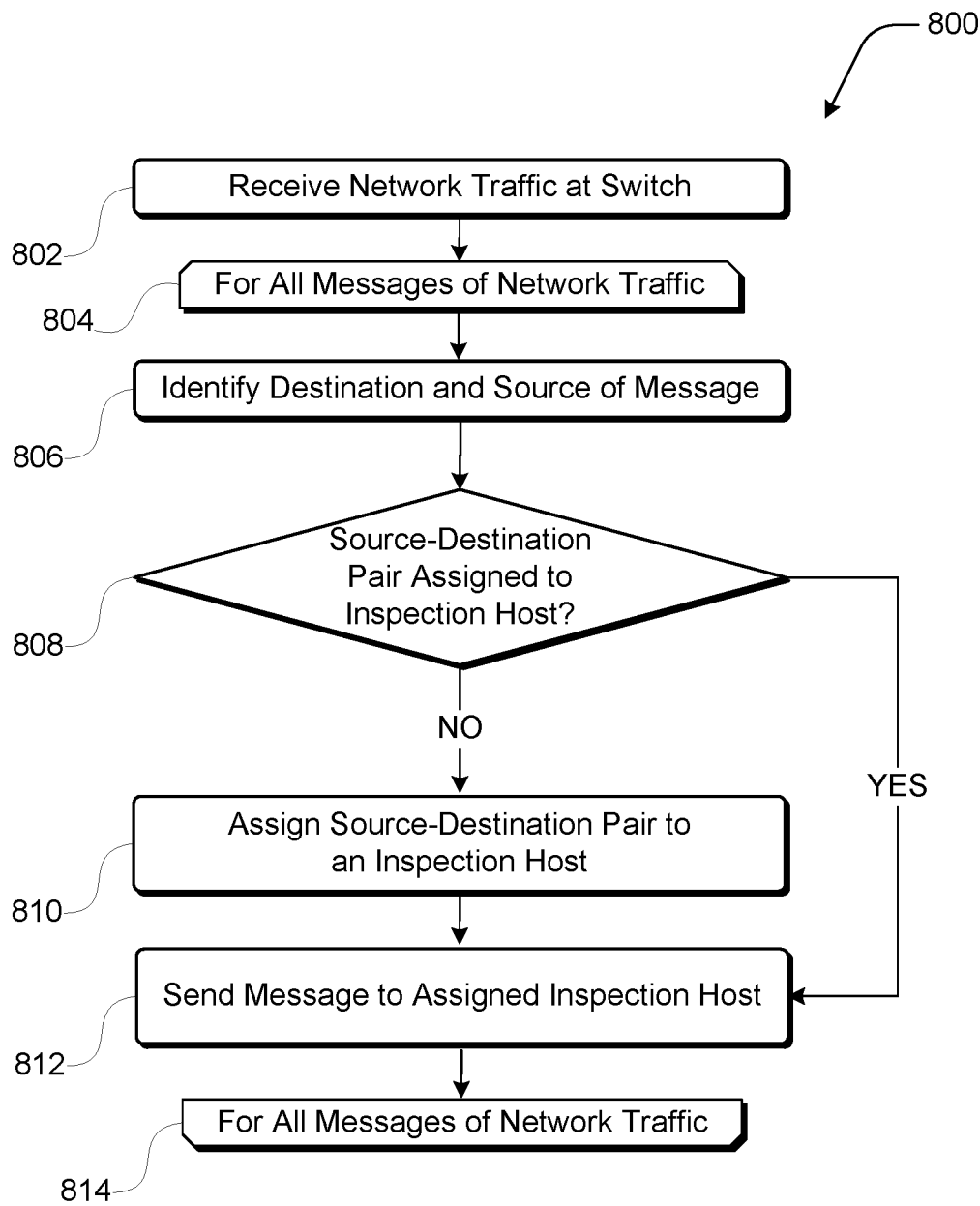
FIG. 8 illustrates an example method of distributing packets of copied network traffic in accordance with one example.

FIG. 8 illustrates an example method 800 of distributing packets of copied network traffic in accordance with one example. For example, the method 800 can be performed by the load balancer 102, 202, 538 of FIG. 1, 2, or 5 or by the switch 608 of FIG. 6. The method 800 begins at 802 where network traffic is received at a switch, and at 804, a loop begins for all messages (e.g., packets) of the network traffic.

At 806 a destination and source of the message is identified. For example, where the message is an IP packet (see e.g., FIG. 3), the packet can include a header and a payload, with the header indicating the source and destination of the packet, which can be identified via an IP address or other suitable identifier.

At 808 a determination is made whether the identified source-destination pair is assigned to an inspection host, and if not, at 810, the source-destination pair is assigned to an inspection host. For example, where the source of a given message is identified as source A and the destination is identified as destination B, then a determination can be made whether the destination-source pair of A-B has been assigned to an inspection host. In various examples, the destination-source pair of A-B would apply to messages where the source is A and the destination is B and where the source is B and the destination is A.

Assigning a given destination-source pair to an inspection host can be done in various suitable ways and according to various suitable criteria or heuristics. For example, assignment can be random, based on actual or estimated load on a given set of analysis hosts (e.g., to assign new destination-source pairs to analysis hosts with more capacity), based on one of the addresses of the destination-source pair being previously assigned to a given analysis host, and the like. At 812, the message is sent to the assigned inspection host, and the loop for all messages of the copied network traffic ends at 814.

While various examples of handling messages of network traffic can include encapsulation having a 1:1 ratio where each encapsulated packet comprises one packet of network traffic, further examples can include encapsulation of other suitable types or ratios. For example, some encapsulation or network tunneling can combine two or more data packets into the content or payload of an encapsulated packet. In another example, a given data packet can be split into two or more portions that can comprise two or more encapsulated data packets. Also, such a manner of encapsulation can remain the same or can be varied. For example, over a period of time, some encapsulated packets can comprise a single data packet, multiple data packets or a portion of one or more data packets.

Additionally, while various examples include sending traffic associated with a given destination-source pair to the same analysis host, some embodiments include sending traffic associated with a given destination-source pair to a plurality of analysis hosts. For example, where traffic from a given destination-source pair is of a volume that exceeds the capacity of a single analysis host, a determination can be made to send traffic associated with the destination-source pair to one or more additional analysis host. In some examples, such a determination at a network switch can be based on feedback from one or more analysis host.

Also, while various examples include sending traffic associated with a conversation between a given destination-source pair to the same analysis host, further examples can include sending sets of network traffic to the same analysis host based on other criteria. For example, network traffic associated with a given network application can be sent to the same analysis host; network traffic associated within a given geographic region can be sent to the same analysis host; network traffic associated with a given user type can be sent to the same analysis host; network traffic associated with a given internet endpoint can be sent to the same analysis host, or the like.

Figure 9:
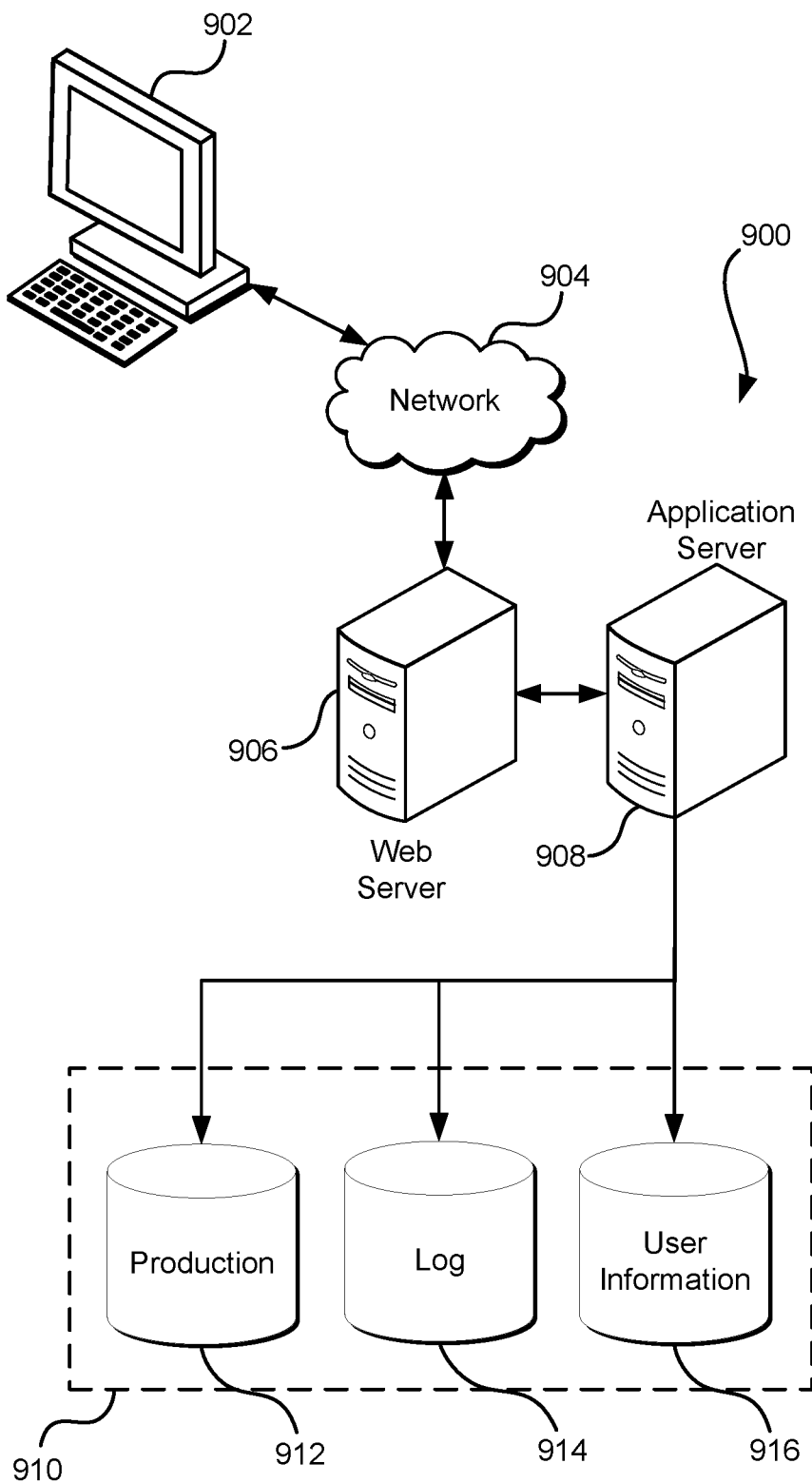
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes a client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms, and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle °, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM"), or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a network switch, a copy of network traffic from a split associated with a network link, the copy of network traffic comprising a plurality of packets, an individual packet of the plurality of packets including a first packet payload and indicating a first packet source and a first packet destination;
   determining, based at least in part on the first packet source and the first packet destination, an analysis host destination for the individual packet of the plurality of packets such that the plurality of packets are distributed among a plurality of analysis hosts with communications between a first packet source-destination pair being sent to the same analysis host;
   generating, by the network switch, a network tunnel for the copy of network traffic by encapsulating the individual packet of the plurality of packets to generate an encapsulated packet, the encapsulated packet including the individual packet of the plurality of packets as a second packet payload of the encapsulated packet, the encapsulated packet indicating a second packet destination corresponding to a determined analysis host destination and a second packet source indicating a false source associated with the network link associated with the split, the false source indicating a communication channel device in between the first packet source and the first packet destination; and
   providing the encapsulated packet to the determined analysis host based at least in part on the second packet destination of the encapsulated packet.

2. The computer-implemented method of claim 1, wherein the false source associated with the network link associated with the split comprises a firewall.

3. The computer-implemented method of claim 1, further comprising:
   receiving the encapsulated packet at a first analysis host;
   de-encapsulating the encapsulated packet to obtain the individual packet of the plurality of packets;
   determining based on an analysis of at least a portion of the encapsulated packet, and a portion of the individual packet of the plurality of packets, that network traffic associated with the individual packet of the plurality of packets meets criteria as suspicious, the analysis based at least in part on the portion of the individual packet of the plurality of packets and the portion of the encapsulated packet defining:
      the second packet source indicating the false source associated with the network link associated with the split;
      the first packet source;
      the first packet destination; and
      the first packet payload; and
   generating a notification regarding the determination that network traffic associated with the individual packet of the plurality of packets meets criteria as suspicious.

4. The computer-implemented method of claim 3, wherein the determining is further based on the network link being a portion of one of a border network, an edge network and a core network.

5. The computer-implemented method of claim 1, wherein:
   the individual packet comprises data copied from an original packet in the network traffic; and
   the communication channel device is located in a path between the split and the first packet destination.

6. A system, comprising:
   at least one network computing device configured to implement one or more services, wherein the one or more services:
      encapsulate a first packet, the first packet including a first packet payload and indicating a first packet source and a first packet destination, to generate an encapsulated packet, the encapsulated packet including the first packet as a second packet payload, the encapsulated packet indicating a second packet destination corresponding to an analysis host destination and a second packet source indicating a false source associated with a network link indicates a communication channel device between the first packet source and the first packet destination, the analysis host destination based at least in part on the first packet source and the first packet destination such that the encapsulated packet is routed to a particular analysis host of a set of analysis hosts wherein communications between a first packet source-destination pair are sent to the same analysis host; and provide the encapsulated packet to an analysis host based at least in part on the second packet destination.

7. The system of claim 6, wherein the first packet is received from a split associated with the network link and the first packet comprises a copy of network traffic communicated over the network link.

8. The system of claim 6, wherein the at least one network computing device comprises a network switch configured to act as a load balancer for sending network traffic to the set of analysis hosts.

9. The system of claim 6, wherein network traffic is received from a plurality of splits associated with a plurality of network links.

10. The system of claim 9, wherein the plurality of splits comprises a first split associated with a first network link of an edge network and a second split associated with a second network link of a core network.

11. The system of claim 6, wherein the system further comprises the set of analysis hosts with at least one host of the set of analysis hosts configured to implement one or more analysis services, wherein the one or more analysis services:

determine, based on an analysis of at least a portion of the encapsulated packet and at least a portion of the first packet, that network traffic associated with the first packet meets criteria as suspicious, the analysis based at least in part on:
the second packet source indicating the false source associated with a split associated with the network link; and
at least one of the first packet source and the first packet destination.

12. The system of claim 11, wherein the system further comprises the set of analysis hosts with at least one host of the set of analysis hosts implementing one or more analysis services, wherein the one or more analysis services:

determine, based at least a portion of the encapsulated packet and at least a portion of the first packet, that network traffic associated with the first packet meets criteria indicating a location within a network is not operating within desired operating parameters, the analysis based at least in part on:
the second packet source indicating the false source associated with the network link associated with the split; and
at least one of the first packet source and the first packet destination.

13. The system of claim 11, wherein the analysis is further based at least in part on the first packet payload.

14. A system, comprising:

at least one computing device implementing one or more services, wherein the one or more services:
receive an encapsulated packet from a split associated with a network link, the encapsulated packet comprising a payload comprising a first packet, the first packet including a first packet payload and a first packet source and a first packet destination, the encapsulated packet further including a second packet destination corresponding to a determined analysis host and a second packet source indicating a false source associated with a network link, the false source indicating a communication channel device between the first packet source and the first packet destination; and determine, based on an analysis of at least a portion of the encapsulated packet and at least a portion of the first packet, that network traffic associated with the encapsulated packet meets criteria as suspicious, the analysis based at least in part on the first packet and the encapsulated packet, the second packet source indicating the false source associated with the network link associated with the split; and at least one of the first packet source and the first packet destination.

15. The system of claim 14, wherein the one or more services further determine that network traffic associated with the first packet meets criteria as suspicious is further based on the network link being a portion of one of an edge network and a core network.

16. The system of claim 14, wherein the one or more services further determine that network traffic associated with the first packet meets criteria as suspicious is further based on a determination that communications associated with one or more of the first packet source; the first packet destination; and the first packet payload are prohibited on the network link.

17. The system of claim 14, wherein the one or more services further de-encapsulate the encapsulated packet at the determined analysis host to obtain the first packet.

18. The system of claim 14, wherein the first packet source and the first packet destination define a source-destination pair.

19. The system of claim 14, wherein the encapsulated packet is received from a network switch.

20. The system of claim 14, wherein the one or more services, in response to determining that network traffic comprising the first packet meets criteria as suspicious, generate a notification regarding network traffic being suspicious and send the notification to a network administrator.

21. The system of claim 14, wherein the analysis is based at least in part on the first packet and the encapsulated packet defining:
the second packet source indicating the false source associated with the network link associated with the split;
the first packet source;
the first packet destination; and
the first packet payload.

* * * * *